US008650064B2

(12) United States Patent
Morsberger

(10) Patent No.: US 8,650,064 B2
(45) Date of Patent: Feb. 11, 2014

(54) SYSTEM AND METHOD FOR COLLECTING SURVEY INFORMATION FROM TARGETED CONSUMERS

(76) Inventor: Louis J. Morsberger, Bethesda, MD (US)

( * ) Notice: Subject to any disclaimer, the term of this patent is extended or adjusted under 35 U.S.C. 154(b) by 0 days.

(21) Appl. No.: 12/633,491

(22) Filed: Dec. 8, 2009

(65) Prior Publication Data

US 2010/0324971 A1 Dec. 23, 2010

Related U.S. Application Data

(63) Continuation of application No. 09/702,045, filed on Oct. 31, 2000, now abandoned.

(60) Provisional application No. 60/237,183, filed on Oct. 3, 2000.

(51) Int. Cl.
*G06Q 30/00* (2012.01)

(52) U.S. Cl.
USPC .......................................................... 705/7.32

(58) Field of Classification Search
USPC ........................................................ 705/7.32
See application file for complete search history.

(56) References Cited

U.S. PATENT DOCUMENTS

| 6,055,513 | A | * | 4/2000 | Katz et al. .................. 705/26.41 |
| 6,477,504 | B1 | * | 11/2002 | Hamlin et al. .................. 705/10 |
| 6,502,745 | B1 | * | 1/2003 | Stimson et al. ................ 235/375 |
| 6,826,540 | B1 | * | 11/2004 | Plantec et al. ............... 705/7.32 |
| 2002/0002482 | A1 | * | 1/2002 | Thomas ......................... 705/10 |

OTHER PUBLICATIONS

Internet Business News, "Net-Based Survey Service Offered by Cogent Computing," Apr. 1, 1999, 1.*

* cited by examiner

*Primary Examiner* — Nathan Erb

(57) ABSTRACT

In one embodiment, a method and system can be configured to collect survey information from targeted customers. The method and system can provide customer survey information to merchants such as retailers and service providers. The system and method can be configured to identify consumers to participate in a survey program.

21 Claims, 3 Drawing Sheets

SYSTEM AND METHOD FOR COLLECTING SURVEY INFORMATION FROM TARGETED CONSUMERS

RELATED PATENT APPLICATIONS

This application is a continuation application of U.S. patent application Ser. No. 09/702,045 entitled "System and Method for Collecting Survey Information From Targeted Consumers," filed on Oct. 31, 2000 now abandoned, which claims priority to and the benefit of U.S. Provisional Application Ser. No. 60/237,183, entitled "Transaction-Driven Surveys and Survey Invitations," filed Oct. 3, 2000, both of which are incorporated herein by reference in their entireties.

BACKGROUND

The present invention relates generally to the collection of survey information, and more particularly, to a system and method for collecting survey information from targeted consumers.

Customer feedback is more important today than ever before. Sales and services have become highly competitive markets. Since these markets are driven by consumers, retailers and service providers need to relate with their customers. In a highly competitive environment, those retailers and service providers who understand customer behavior and have the ability to modify their operations and marketing efforts based on customer behavior are usually successful.

Customer behavior encompasses many aspects of consumer activity, including decisions as to where to shop and why. Retailers and service providers need to have feedback as to whether their marketing and pricing strategies are effective. Customer feedback and satisfaction are representative and generally predictive of consumer behavior. As a result, customer feedback and satisfaction are information for which retailers and service providers are willing to pay.

Currently, retailers and service providers obtain feedback from numerous sources. Some conventional sources are customer-initiated, such as in-store comment cards and web sites that publish customer reviews of products and services. Other conventional sources are company-initiated, such as surveys conducted by research firms or in-house corporate research departments.

Retailers encounter several difficulties in trying to obtain useful customer feedback and information from conventional sources. One problem is the timing of the information. Depending on the particular survey system being used, the time period between the commissioning of the survey and the receipt of survey results is long, possibly several months. The delay is related in part to the identification of customers for the survey and the collection and analysis of the survey results. A survey may be a general survey of a group that is representative of a customer base, in which customers must be identified. Customer contact data, such as an address, phone number and E-mail address, needs to be collected and maintained. The acquisition of such data is costly, labor intensive, and many times intrusive. Moreover, the creation and ongoing management of a customer database is expensive as well. People frequently move, thereby rendering their contact information obsolete.

Similarly, the collection and analysis of survey results affects the timing of survey information. Once the survey information has been collected, it needs to be input into a system which can process the information. Depending on the format of the collected information, the inputting, tabulation and processing of the collected survey information is time intensive.

Another problem is expense of administering the survey. Conventional survey providers charge fees for collecting and processing the survey information. The fees are usually based on the scope of the survey and are generally high because the cost of administering the survey is typically expensive. For example, surveys conducted by phone or mail are labor intensive and thus, expensive.

Conventional surveys that are based on customer-initiated feedback mechanisms do not provide a good representation of a customer base. An example of such a feedback mechanism is a web site that accepts and publishes feedback from unscreened customers. Many times, customer-initiated feedback comes from aggrieved customers only.

Accordingly, there is a need for an improved system for the collection of survey information from customers. There is also a need for a system that can be used to solicit survey information from targeted customers on a timely basis. There is a need for a system and method for easily and economically collecting survey information from targeted customers of particular retailers and service providers.

It is therefore desirable that an improved method and system for collecting survey information from targeted customers be provided that overcome the limitations of conventional survey methods and systems.

SUMMARY

A method and system for collecting survey information from targeted customers is provided by the present invention. The method and system of the present invention collect and provide customer survey information to merchants, which may include retailers and service providers, and other parties, such as manufacturers, distributors, etc. Consumer survey information may include information regarding products, services or operations, as well as the effectiveness of a marketing policy or a competitive strategy. The system provides customer survey information to merchants in a timely manner to permit the merchants to quickly and effectively respond to the information. The system also provides similar information regarding competitors.

A target population of consumers who may be surveyed regarding their opinions of actual purchases and purchase experiences are identified. Such purchases and experiences are identified by data provided by a data provider, such as the consumer's credit card issuer. Individual consumers are invited to complete surveys regarding specific transactions and/or merchants. By targeting particular consumers to participate in the survey program, a representative sample of a customer base can be created.

Once a target population of consumers is identified, those consumers are solicited to register in a survey program. Consumers receive offers to register to participate in the survey program. Consumers may register for the survey program by providing requested information about themselves. The consumer specific information is stored in profiles that correspond to each particular consumer that registers.

The survey system utilizes transaction records for transactions involving payments for products or services by a participating consumer. In particular, the program relates to transactions that utilize transaction records in an electronic or digital form. Such transaction records may include identification codes designating each of the parties to the transaction as well as characteristics of the transaction. The codes may facilitate the identification of the consumer, the retailer or service provider, the payment amount, and possibly, the category of the transaction. Additionally, a transaction record may also include information regarding the product or service that was purchased.

The system monitors such transactions and identifies those that involve consumers participating in the survey program. The system then determines whether the identified transaction is in a category of transactions for which the research firm would like to solicit survey information. The transaction categories may be determined based on the merchant, the purchased product or service, the payment amount, the location of the store of the purchase, competitors of a particular merchant, etc.

Once a particular transaction that meets the desired criteria is identified, the system determines whether an invitation to complete a survey should be sent to the consumer who participated in the transaction. This determination may be made using historical information relating to the consumer. The system monitors and maintains information relating to participants, including: when participants have been invited to complete a survey, how many times the participant has been invited, which invited participants have completed a survey, etc. This information may be used to reduce the quantity of wasted invitations.

Once the system determines to send an invitation to a consumer, a survey invitation is generated. The survey invitation may be personalized and may reference the particular transaction for which survey information is being sought. The survey invitation directs the consumer to an interface, such as an interactive forum, through which the consumer can complete a survey instrument. Alternatively, the survey invitation may include a survey instrument. Rewards or incentives are offered in exchange for the completion of surveys.

The survey information is collected and processed. The processed information may be sold to merchants or third parties.

Further features and advantages of the invention, as well as the operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit in the corresponding reference number.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION

Figure 1:
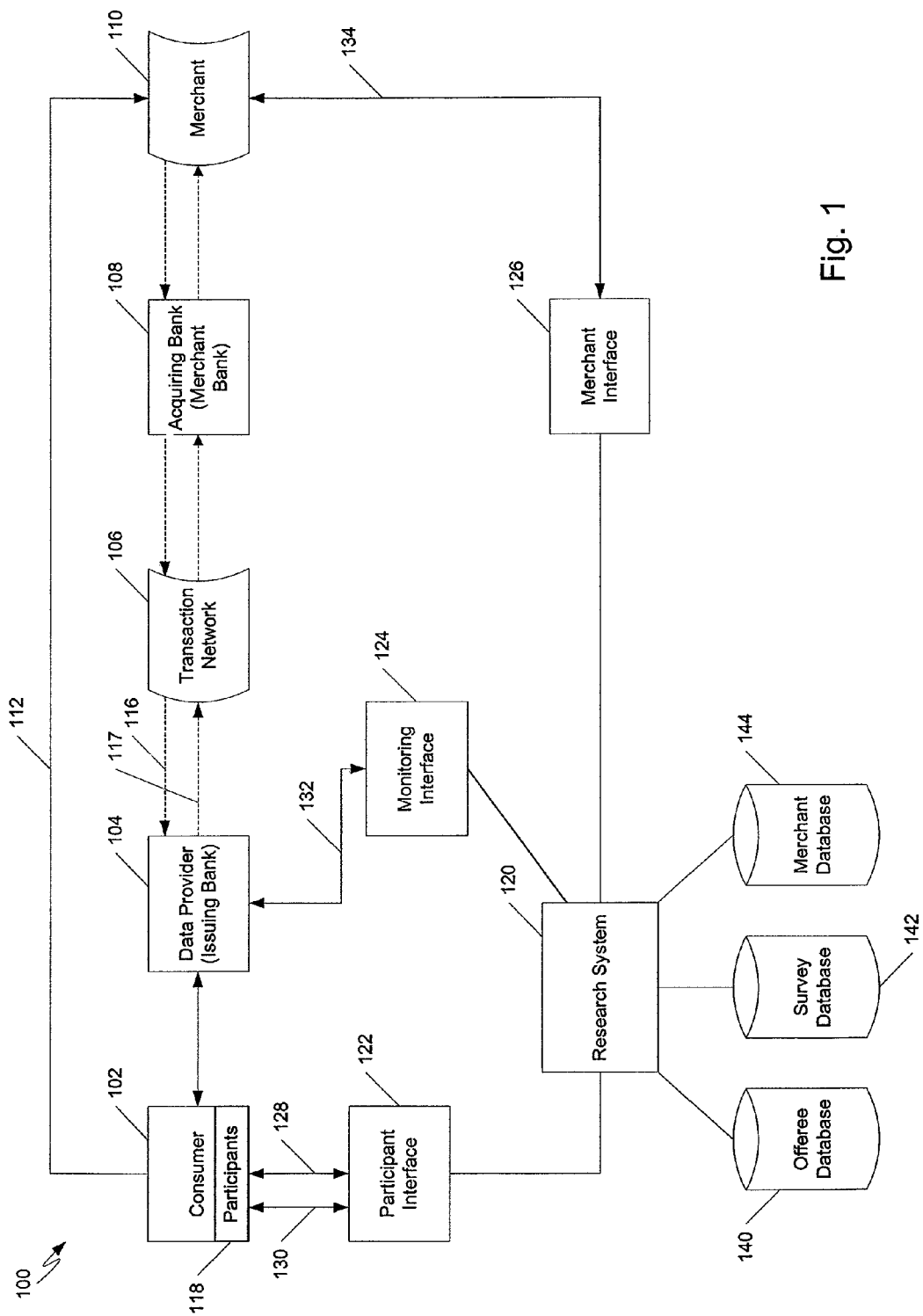
FIG. 1 illustrates a system for collecting survey information according to one embodiment of the present invention.

Companies need customer survey information on a timely basis in order to be competitive. Some examples of such companies are: retailers; retail service providers; consumer service providers, such as health care providers; market research firms, who may sell survey information to publishers or other third parties; manufacturers; etc. The term "merchant" is used herein in reference to these companies.

Several terms are used herein to refer to consumers during the various stages of the system and method of the invention. The terms "consumer" and "customer" are used herein to refer to a person, company, business, or service that acquires a product or a service. The term "offeree" is used herein to refer to those consumers or customers that are solicited or receive offers to participate in a survey program. The term "participant" is used herein to refer to those offerees who have registered to participate in a survey program. The term "respondent" is used herein to refer to those participants who have completed a survey. Each of these terms is described in detail below.

Similarly, the terms "research firm," "survey firm," and "survey conductors" are used interchangeably herein to refer to any person or organization that conducts or coordinates a survey. It will be appreciated that the terms identified above are intended to be illustrative and exemplary and not limiting on the description of the invention.

Consumer survey information is a general category that includes several types of information. One type is a consumer's satisfaction with a purchased product or service. Another type is a consumer's interest in or assessment of a product or service that the consumer might consider purchasing in the future. Another type is a consumer's interest in or assessment of the manner in which a product or service is marketed.

An initial step in every survey is to determine who has information and should be surveyed. A conventional mechanism for determining who should be surveyed is to send out a generic mass mailing of invitations or surveys and see who responds. Typically, the results of a survey conducted by such a mass mailing are not useful. The cross-section of the respondents to the invitations may not be representative of the desired group and is likely not to provide the survey system with desired results.

The system of the present invention may provide survey data from a representative sample of a company's customer base, surveyed regarding most of the stores or units in a chain. Additionally, the system provides comparable information regarding competitors.

In the present invention, the system selects particular consumers who should be solicited to participate in a survey panel. Those solicited consumers who decide to participate, register for the survey program. While the participants are registered, the system of the invention monitors transaction records representative of their purchases. When a participant purchases a product or service from a category for which survey information is to be collected, a survey invitation is sent to the participant. The survey invitation may be an electronic message directing the participant how to complete a survey instrument, such as an online questionnaire. Alternatively, the survey invitation may include a survey instrument that the participant can complete. Completed surveys are processed and results are generated. Merchants can access the survey results via an interactive forum, such as a web site. Access to survey results may be controlled by the research firm.

The system maintains historical participant information. Such historical information may include: which participants have been invited to complete a survey, how many times a participant has been invited, which invited participants have completed a survey, etc. This historical information is used to determine the likelihood that a particular participant may complete a survey and whether to invite a participant to complete a survey. Based on the participants, the system can estimate how many invitations to complete a survey should be transmitted to achieve the desired results.

In the present invention, the collection of survey information has been redefined. The method and system of the present invention enable merchants to easily and efficiently determine their customers' opinion on a particular matter, such as their satisfaction. To illustrate the features of the present invention, the process and system are described in several components: (1) identifying participants; (2) identifying merchants; (3) monitoring transactions; (4) evaluating transaction records; (5) soliciting survey information; (6) survey information and instruments; (7) collecting survey information; and (8) processing and distributing survey results. It will be appreciated that the process and system of the present invention may be described using a different combination of components. Finally, an exemplary embodiment and the operation of the process of collecting survey information from targeted consumers are described.

Identifying Participants

The method and system of the present invention are related to the collection of survey information from targeted consumers. A very time consuming and expensive part of conventional survey systems is the identification of participants for the survey.

Initially, a group of potential participants in the survey panel needs to be identified. The manner in which the potential participants are identified is related to the data desired regarding the participants. Numerous companies have lists of customers and some data specific to each customer. Such companies may be referred to as "data providers." In the illustrated embodiment, the data provider is a credit card issuer, such as an issuing bank, and the group of potential participants are customers of the credit card issuer. Other examples of data providers include: a bank on which a check or draft is drawn; a bank accepting a check or draft; a credit card acquirer, such as a bank servicing merchants accepting a given credit card; a debit card or smart card issuer; a travel and entertainment card issuer; a payment processor acting on behalf of other parties; and a transaction network or association.

Offerees are solicited to participate in survey panels over a predetermined period of time. For example, survey panels may last a few months, weeks, etc. The offerees may be asked to complete several questionnaires or surveys while they are on a survey panel. For example, offerees may be asked to complete ten questionnaires over a two to three month period.

There are several categories of consumers that a research firm targets for input. Some examples of such consumers include: personal consumers; managers involved in purchasing decisions for businesses; and managers and professional staff involved in purchasing decisions for professional services firms, including, for example, providers of health care services.

In the illustrated embodiment, offers to participate in a survey panel may be targeted to particular customers. A data provider may collect demographic information from its customers in exchange for an account. Many issuing banks typically monitor the purchasing activity of their customers. The survey conductors can utilize the demographic and purchasing information collected by the issuing banks to determine a list of potential participants for a survey. This information eliminates the time intensive and expensive task of creating and maintaining a database of customers for future survey panels.

The survey conductors send offers to participate in a survey program to those customers whose demographic information and purchasing activity match the profiles desired for a particular survey panel. Purchasing activity can include several types of purchasing behavior. Some examples may include: the average amount of money the customer spends during a purchase; the frequency of purchases; the timing of purchases, relative to the day of the week, the end of the month, holidays, etc.; and the categories of articles or services purchased.

Once identified, potential participants are solicited to participate in a survey panel. Typically, the firm or system conducting the survey sends an offer to participate to each of the potential participants. Those invited customers may be referred to as "offerees."

Data providers, such as credit card issuing banks, typically send an account statement to each of their customers on a periodic basis. These account statements are usually accompanied by one or more advertisements for a service, product, etc. In the illustrated embodiment, an advertisement containing an offer to participate in the survey is included with the account statements that are sent. A data provider may provide to the research film information for some of its customers. With this information, the research firm can select those customers to whom it would like to send an offer to participate. Alternatively, the offers to participate may be sent to all of the customers by the research firm in a mass mailing or blanket-like manner.

Each offer may include information related to the particular survey program. For example, the offer may include a description of the survey program, the potential rewards or incentives for participating in the survey program, and instructions how to register as a participant in the survey program. An offer may also identify the length of the survey program, such as 3 months, and the number of surveys expected to complete, such as 10 surveys. The offer may include a choice of incentives, which are described in greater detail below.

The instructions may direct the offeree to a participant interface, such as an interactive forum or a web site. In the illustrated embodiment, the invitation includes a uniform resource locator (URL). The offerees who want to participate can register via a registration web page using the URL. Some other ways by which an offeree may register are by telephone, facsimile, mail, electronic mail, and by going to a physical location.

Typically, not all of the offerees decide to participate in the study. Many offerees decline to participate for various reasons. Those offerees who decide to participate provide information about themselves via the participant interface, which is described in greater detail below. In the illustrated embodiment, predetermined categories of information are solicited from the offerees. The inputted information may include demographic information, service preferences, retail preferences, free form input, etc.

In the illustrated embodiment, the system includes a data storage medium that is used to store information related to offerees and participants. This data storage medium may be a database and is referred to as an offeree database. The offeree database includes information on all customers of the data provider who are being solicited to participate in the survey.

In the illustrated embodiment, a contact summary is created for each customer who receives an offer to participate in a survey program. Each contact summary includes several types of information. For example, a contact summary may include demographic information and contact information. A unique identifier, such as an identification code, is created for each participant. Preferably, the identifier is different from the credit card number of the participant. The identifier can be a numeric code, alphabetic code, or combination thereof. The identifier is associated with the corresponding profile. This identification code is used to track those prospective offerees to whom offers have been sent.

Contact information relating to each customer is collected and stored. Some contact information is historical in nature and can be used to determine the likelihood that the offeree would respond to the offer to register to participate in the survey. Often an offeree is solicited several times before the offeree decides to participate in a survey. Similarly, after an offeree has been solicited a particular number of times without success, it is evident that the offeree is not likely to participate in a survey. By knowing this information, wasted solicitations can be minimized. Examples of contact information include:
- when offers to participate were made to the offeree;
- the specific offer that was made;
- the offeree's responses to the offers to participate;
- how the offers were made to the offeree;
- the quantity of offers made to the offeree; and
- the quantity of registrations in response to the offers.

It will be appreciated that any one of or combination of the information categories above may be collected and stored. It will be appreciated that specific information for the offerees and participants is collected and stored in any conventional manner. Preferably, the information is stored in a format that facilitates subsequent review and processing of the information.

The system also tracks and maintains additional information relating to offerees who have registered for a particular survey program. Such offerees are referred to as participants. Typically, the participants are a subset of the offerees. In the illustrated embodiment, participants authorize their issuing bank to monitor records of those transactions in which they have participated when they register to participate in the survey program.

The additional participant information relates to survey specific and demographic information. The additional demographic information includes demographic data and contact data input during the registration process. Survey specific information includes data collected from previous surveys. Some additional contact information includes:
- the quantity of invitations made to participate in the survey;
- when invitations to complete a survey were sent;
- the content of the invitations;
- confirmation data by which an offeree agreed to become a participant;
- whether a participant completed a survey;
- which surveys a participant completed;
- the participant's incentive selections;
- the participant's incentive account data; and
- identification of transactions for which a survey was received.

It will be appreciated that any one of or combination of the categories of contact information above may be collected and stored.

In an alternative embodiment, information relating to customers may be generated by the research firm. In other words, demographic characteristics of a customer can be implied based on the customer's zip code, address, etc.

The system includes a participant interface that performs several functions. Offerees and participants can provide requested input via the interface. In the illustrated embodiment, the participant interface is a forum with which offerees and participants can interact, such as a web site. In an alternative embodiment, participants can register through the mail. In another embodiment, participants can register by phone by calling an agent.

One function of the participant interface is the registration of participants. An offer to participate in a survey panel directs the offeree to the participant interface. In the illustrated embodiment, the invitation may include a web site address.

Identifying Merchants

As previously discussed, merchants are interested in the opinions of their customers. In the illustrated embodiment, the research firm generates information relating to merchants in which it is interested in collecting consumer information. The research firm may be interested in particular merchants for several reasons, such as the categories of products or services that the merchant offers, the location of the merchants, etc. Merchant related information is useful in focusing on the appropriate survey information that is collected.

Some basic information relating to the merchants of interest can be generated by the research firm prior to conducting the survey. This information is stored in a merchant database in profiles for each merchant. Alternatively, such information may be provided to the research firm by merchants themselves prior to the survey.

Some examples of the information generated by the research firm or provided by a merchant may include:
- company name;
- locations of facilities;
- affiliation or hierarchy of individual merchant locations;
- categories of products or services offered;
- categories of products or services for which survey results are desired; and
- magnitude of purchases for which survey results are desired.

It will be appreciated that any one of or combination of the above-described merchant information may be stored in a data storage medium, such as a merchant database. It will also be appreciated that merchant-related information, other than that identified above, may be generated or received from merchants. This merchant-related information can be utilized to further analyze the collected survey information. It is to be appreciated that merchants do not need to be identified prior to the collection of consumer information.

In the illustrated embodiment, the system includes a merchant interface which performs several functions. Some of these functions are:
- registration of merchants;
- listing of surveys available for purchase or access to merchants;
- communication and setting of communication options regarding availability of specified types of surveys;
- sale of survey results to merchants;
- access for authenticated merchant staff to purchased survey results; and
- handling of merchant inquiries and service needs.

It will be appreciated that the merchant interface may perform functions in addition to those identified above.

In the illustrated embodiment, merchant information is collected and stored in the merchant database. One source of merchant information is the data provider, which may maintain a database of such information in its normal course of business. Another source of merchant information is the merchants themselves. The merchants may provide requested information if they are customers of the research firm.

In the illustrated embodiment, the system includes a data storage medium, such as a database, in which the merchant information is stored. Profiles are developed for each merchant. A unique identification code is created for each merchant and associated with the corresponding profile. Some examples of the merchant information that is stored for merchants include:

merchant identification information;
    product or service categories to which the merchant is assigned;
    any affiliation or hierarchy of merchant locations within the structure of the merchant;
    the status of the merchant account;
    dates invited to participate in previous surveys;
    identification of previous surveys in which participant participated;
    categorization of previous survey in which participant participated;
    access privileges for survey results and the merchant account; and
    the contact history with the merchant, including sales or marketing contacts.

It will be appreciated that other information related to merchants in addition to those identified above may be stored in the merchant database.

Monitoring Transactions

Once participants have been identified, a mechanism for identifying which participants to survey is needed. Since merchants typically are interested in their customers or customers' transactions in a particular category, relationships between participants and merchants of interest can be identified. The mechanism may provide access to recent data matching customers to merchants of interest.

In the illustrated embodiment, the mechanism which matches customers or participants to merchants of interest is a transaction. The transaction, which may involve an electronic payment, such as a credit card, is represented by a transaction record that is in an electronic or digital form. Such transactions are typically between a customer and a merchant. A transaction record may include several codes which identify the customer, the merchant, the location of the merchant, and other transaction specific information, such as the product or service purchased and the amount of the electronic payment.

By scanning and evaluating transactions records, the system of the present invention can survey customers regarding their offline and online transactions. Access to transaction records is available via a data provider, such as a credit card issuer.

Examples of other parties to the communication of transaction data to the customer include third-party billing services, bill presentment services, and bill aggregators. Depending on the amount of customer information, each of these parties may be utilized as a data provider in accordance with the invention.

In the illustrated embodiment, access to transaction records provides access to customers of all merchants in a particular category, not just the customers of a particular merchant. Such access enables the system to profile all competitors in a category and to market that data to all competitors in that category.

The system of the present invention includes a monitoring interface 124. The monitoring interface monitors the transaction records of a data provider to identify transactions for which survey information is desired. In the illustrated embodiment, the monitoring interface is a computer program that has access to the collected transaction data. Preferably, the computer program is resident on the system of the data provider. The operation of the monitoring interface is discussed in greater detail in the following section entitled "Evaluating Transaction Records."

Evaluating Transaction Records

Transaction records are scanned and filtered so only those transactions that are relevant to a survey are identified. The monitoring interface uses predetermined criteria for the evaluation of transaction records. The predetermined criteria are generally based on the desired scope of the survey. The criteria may include customer related requirements, research firm related requirements, and general transaction requirements.

In the illustrated embodiment, a relevant transaction needs to meet customer, research firm, and general transaction requirements. These requirements or criteria are discussed in regard to several categories: (1) customer related information; (2) qualifying transaction information; and (3) quota information. It will be appreciated that transactions may be evaluated using information and categories other than those identified above.

The first category is customer related information. Customer related information is collected from the data provider and from participants as they register for a survey panel. As previously discussed, profiles are created for each of the participants.

Initially, an identifying system is generated to identify the participants of a survey panel. A unique identification code is used for each of the participants. There are several ways by which the codes can be developed. In one embodiment, a unique code can be printed on each solicitation that is sent to an offeree. When an offeree registers for a survey program, the offeree inputs the code and the offeree's specific information is subsequently associated with the code. In an alternative embodiment, a participant may provide information requested during the registration process, including a credit card number. The participant information is transmitted to the data provider so the data provider can match the appropriate files from its system with the inputted participant information. The data provider may generate a unique code that is subsequently associated with the participant. It will be appreciated that other mechanisms and procedures may be used to generate unique identification codes for participants in a survey program.

In the illustrated embodiment, the identification codes are distinct from the credit card numbers of the customers. The identification code may be a numerical value. In an alternative embodiment, the code is a combination of letters and/or letters and numbers. Each of the codes is associated with a participant and the participant's profile.

The identification codes are utilized by the monitoring interface or technology as part of the customer related criteria to determine relevant transactions for the survey. The monitoring interface scans the transaction records of the data provider to identify those records involving a customer with a code that matches one of the participant codes. If the codes match, then that particular transaction is identified for further analysis and evaluation.

The second category is qualifying transaction information. In the illustrated embodiment, the criteria for a qualifying transaction has several components. First, the payment amount in the transaction should meet a predetermined level. Second, the purchased product or service should be in a category that is being surveyed or the merchant should be in the category of interest.

In conventional electronic transactions, the card network and the acquiring bank establish a unique code that identifies the company. The code may also identify the location of the facility or store of the company. For example, a particular code may represent ABC Electronics in Small Town, State A.

In the illustrated embodiment, the system of the present invention may utilize designators to indicate merchants of interest to the survey program. The designators may be unique codes for different product or service categories or for different merchants. The designators may be based on the codes used in conventional electronic transactions. For example, the designators for merchants can be based on stored data provider codes. The designators may be input into the monitoring technology for the evaluation of the transaction records.

Once the codes for the merchants of interest have been inputted into the monitoring technology, the transaction records involving merchants of interest can be identified. The transactions which have been identified as involving a participating customer are now analyzed to determine whether the merchant is of interest to the research firm. The monitoring interface compares the merchant code data in the transaction record with the merchant of interest codes to determine whether the research firm is interested in survey information regarding the merchant.

The research firm can establish a minimum transaction payment amount for which surveys are conducted. The research firm may not be interested in feedback from a customer that spends a minimal amount of money at their store. For example, a merchant is likely not interested in the opinion of a customer that spends $4.00 on batteries once a month.

The data from the transaction record includes information corresponding to the payment amount in the transaction. The monitoring interface compares the payment amount information with a predetermined level established by the research firm. If the payment amount meets or exceeds the predetermined level, then the transaction is identified for further evaluation. However, if the payment amount does not meet the level, then the transaction is no longer considered for the survey.

The research firm can determine which categories of products and services are indicative of the customers from which it would like to receive feedback. For example, a research firm can indicate that it wants surveys conducted on all purchases of electronic equipment over $15.00.

Once a transaction has met the payment amount criteria, then the category of the purchase is determined. If the category of the product or service is one of the designated categories, then the transaction is identified for further evaluation.

It will be appreciated that the order in which the customer and qualifying transaction determinations are made may vary. It will be also appreciated that any one of the above described criteria may be used alone or in combination with others to determine whether a transaction qualifies as a relevant transaction for a survey.

Electronic transactions occur on a continuous basis. The system of a data provider typically receives authorization requests all day. Preferably, the monitoring of the transactions and authorization requests does not adversely impact the normal operations of the data provider.

In the illustrated embodiment, the data provider creates a separate repository of data that is collected from the transactions. The data repository is a database that is separate from the normal operations of the data provider. The collected data is primarily transaction records, which may include the identification of the customer, the merchant, and other transaction specific information.

In the illustrated embodiment, the data provider operates a system, such as a server, with a software program located thereon that searches and analyzes the transaction records. When the program identifies a transaction that meets the criteria for a relevant transaction, the monitoring technology forwards information regarding the particular transaction to the survey conductors. The information may be sent to the survey firm via a network in any conventional manner. The data provider system reviews multiple transaction records at a time and forwards relevant transaction information to the survey firm for multiple transactions in batch or bulk form. In an alternative embodiment, the transaction records are reviewed in real-time and the relevant transaction information is forwarded in real-time.

By using a separate repository, the data provider can control what data is forwarded to the survey system. Similarly, the data provider can verify that the customers about whom data is being forwarded are participants who have authorized the monitoring of their transactions.

Soliciting Survey Information

The value of survey results is related to the participants in the survey. As the similarity between a merchant's overall customer base and that of the survey participants increases, the customer survey results are more likely represent the opinions of the overall customer base. The pool of participants in a survey can be targeted based on the desired demographics of the survey panel.

Once a relevant transaction has been identified, the monitoring interface determines whether to send out an invitation to complete a survey based on that transaction. This determination focuses on how many completed surveys are desired and involves several components including: (1) the likelihood that a participant will complete a survey; (2) the anticipated number of completed surveys regarding a merchant; and (3) the number of completed surveys received regarding a merchant.

The likelihood that a participant will complete a survey is based on a mathematical analysis. In the illustrated embodiment, the system includes an offeree database in which participant profiles with historical data are maintained. Some examples of historical data include: the number of times that the participant has been invited to complete a survey and the number of times that the participant has completed a survey. This data as well as similar data for other participants with comparable demographic characteristics is considered in determining the likelihood that the participant would complete a survey if invited.

The survey system determines how many completed surveys are desired. Then, the number of invitations that should be sent out to achieve the desired completed survey quota is estimated based on the expected rate of survey completions. The expected rate of completion can be estimated based on previous experiences and participant specific information.

For example, a research firm may want 100 surveys from Circuit City customers. Based on historical data, the research firm can determine what percentage of invited participants are likely to complete surveys. For example, historical data might indicate that 20% of the invited participants will complete the survey. Accordingly, the research firm would want to send out 500 invitations.

In the illustrated embodiment, a running count of invitations sent out for a survey is maintained during the survey process. Prior to sending an invitation, the system checks the current balance of extended invitations and completed surveys and determines whether either of the corresponding quotas of extended invitations and completed surveys has been met. As an invitation is sent to a participant, the balance of extended invitations is incremented. Similarly, the balance of completed surveys is incremented upon the receipt of a complete survey.

In the illustrated embodiment, there is a time lag between the transmission of an invitation and the receipt of a completed survey. The time lag is dictated by the amount of time that it takes for the participants to complete the survey. It will be appreciated that it is not necessary for the system to be exact on the quantity of completed surveys.

Another component of whether a participant is likely to complete a survey is the participant's "price" for the surveyed information. Customers have information for which merchants are willing to pay. Each customer has an internal "price" for such information. Typically, different customers have different prices for their information. In order to obtain information, the system utilizes incentives to entice participants to complete a survey.

Different incentives are created to entice participants to register and complete surveys. Various incentives are offered to cover a range of participant "prices." Some examples of incentives include:
 a donation to a charity of the participant's choice;
 redeemable electronic points for an online merchant;
 sweepstakes entry;
 airline mileage or points;
 other loyalty point programs; and
 discounts on products or services provided by merchants.

It will be appreciated that incentives or rewards other than those identified above can be offered to participants in a survey.

In the illustrated embodiment, the system includes incentive account information for each participant. The incentive account information may be included as part of the participant profile. A participant's account may identify elected incentives, a redeemable goal or target amount for each incentive, and a summary of accumulated incentives. A participant can access incentive account information using the participant interface. Access to accounts on the system may be controlled in any conventional manner, such as a name and password combination. Participants can log onto the survey firm's web site and ask questions, view account information, etc.

Survey Information and Instruments

The content of a survey depends on the defined objectives. A survey can be focused on the satisfaction of a customer with a particular transaction and/or the customer's overall purchasing experience. The survey format may include targeted questions and/or fields for open form type input.

The system utilizes survey instruments which are developed based on the desired survey results. Preferably, the survey instruments are generally developed on a transaction category basis. In the illustrated embodiment, links to the survey instruments are utilized with the participant interface to enable the participants to locate and complete the instruments. In alternative embodiments, the survey instrument may be included in the survey invitation or as an attachment to the survey invitation, in which case, the participant can complete the survey instrument and send it back to the research firm.

In the illustrated embodiment, the survey instruments can be dynamic or static. A dynamic survey instrument is structured to dynamically pose different questions according to a participant's earlier answers. Dynamic questions enhance the collection of more sophisticated data and reduce the amount of the participant's time. For example, a participant answering "No" to Question No. 5 does not have to be told to skip to Question No. 10 because the survey program automatically displays the next appropriate question. Similarly, the dynamic questions can be structured in a decision tree-like format in which the next question is based on the particular answer to the previous question. It is to be appreciated that survey instruments which are sent as part of a survey invitation are typically static in nature.

The questions can be limited response questions or open-ended questions. An example of a limited response question is "How would you rate the store's appearance? 1—Poor . . . 5—Excellent." An example of an open-ended question is "Would you like to mention any specific store associates(s) who helped you and any comments that you have regarding them?" The questions may relate to the particular product or service purchased.

In the illustrated embodiment, survey instruments may be presented on a graphical user interface, such as a computer screen. A survey instrument can be faun-like in appearance or a series of questions. The participant interface sets up different surveys for each participant purchase. A specific URL is generated for each survey in order to personalize the surveys. Predetermined questions are created for different categories of products and services. For example, specific questions may be presented relative to consumer electronics, appliances, toys, etc.

The system of the present invention includes a survey database. Survey instruments, in particular the uncompleted templates, are stored in the survey database for each category of qualifying transaction. Preferably, the survey instruments are stored in a manner that facilitates retrieval of the instruments. Once a participant completes a survey, the completed survey is stored in the survey database. In the illustrated embodiment, the uncompleted surveys and the completed surveys are stored relative to their categories of transactions.

Collecting Survey Information

The success or efficiency of a survey is determined in part by the rate at which surveys are completed. The rate of survey completion is influenced by several factors, including the format of the invitation to complete a survey and the manner in which the survey information is collected. Accordingly, the survey conductors have some control over the completion rate based on the invitation format and the survey collection process.

Once the decision to send an invitation to a participant has been made, the format of the invitation is determined. Participants may have various reasons why they elect or decline to complete a survey. Accordingly, the invitation should reinforce to participants the incentive value of responding. The invitation is preferably relatively appealing and easy to understand.

An invitation may include several pieces of information relating to the particular relevant transaction. In the illustrated embodiment, an invitation may include any of the following: participant information, merchant information, transaction information, and survey information. It will be appreciated that an invitation may include information other than the types identified above.

The format of the invitation includes participant information. Preferably, the invitation is personalized to the individual participant by addressing the participant by name. The participant's name may be included in the greeting of the invitation. The invitation may also include information relating to the participant's incentives. In the illustrated embodiment, the invitation identifies the selected incentive and provide a status of cumulated incentives. For example, the invitation may include a statement such as: "With the completion of this survey, our donation to [charity of choice, e.g. the Red Cross] on your behalf will total $7.00, and after your $10^{th}$ survey, will total $15.00." Such a statement includes an example of a reinforcement of why the participant should complete surveys.

In the illustrated embodiment, the invitation may include merchant information and transaction information. The merchant information may identify the merchant that is the subject of the survey, whether or not the merchant has indicated an interest in the survey results. The transaction information may identify the particular transaction about which feedback is desired and reminds the participant of the context of that transaction. By including specific information related to the transaction, the participant's memory of his or her experiences is likely to be triggered. Some examples of merchant and transaction information in an invitation include:

the name of the merchant;
the location of the merchant at which the transaction occurred;
the date of the transaction;
the identification of the category of the purchased product or service; and
the identification of the actual product or service purchased.

It will be appreciated that an invitation may include any one or combination of these types of information as well as other types not identified above. It will be appreciated that invitations can include various information regarding the transaction to personalize the invitation and confirm the transaction.

In the illustrated embodiment, an invitation also includes information about the survey. Such information may include the identification of the firm conducting the survey and the data provider through which information relating to the transaction was collected. For example, an invitation may include a statement such as: "Dear Sally Smith, Greetings, from Research Firm X and from Data Provider Y, as part of the survey program you previously were asked to participate in, we would like to survey you or ask you questions or her your thoughts about your recent shopping experience at Electronics, Ltd."

In the illustrated embodiment, a survey invitation also includes instructions regarding how to complete a survey. The instructions are related to the channel by which the participant is to complete the survey and accordingly, may take several forms. Some of the channels that participants can use are: telephone; facsimile; mail; electronic mail; secured messaging; and an interactive forum, such as a web site. The survey invitation may also include a target date by which the survey should be completed.

In the illustrated embodiment, the invitation includes a link or a URL which directs the participant to the participant interface. After clicking on the URL, the participant is directed to an interactive forum at which they can provide their input, such as a web site.

In an alternative embodiment, the survey invitation may include a survey instrument in the contents of the invitation or as an attachment thereto. Such an arrangement facilitates access to survey instruments for those participants who are not online.

The participant interface controls access to the survey instruments by authenticating participants for only those instruments that they have been invited to complete. The invitations to complete a survey are transmitted by the participant interface. The participant interface also transmits participant status to the monitoring interface to activate or deactivate a participant.

Participants can complete the survey instrument several ways, including interacting with a web site, such as the research firm's web site. Preferably, the survey instrument includes a mechanism by which the participant can indicate that they are finished. Any conventional mechanism can be used, such as an icon that runs a macro upon selection. The completed survey information is transmitted to and stored in the survey database.

The input from participants in a survey depends on the format of the questions. The input may include:
direct responses to questions;
open-ended remarks or comments;
the identification of specific staff and comments relative thereto; and
a request for follow-up from the merchant.

It will be appreciated that participant input may include responses other than those identified above.

Processing and Distributing Survey Results

As the survey information from the participants is collected, the system processes the collected information and generates an output, such as a report. The output can be offered to various parties, including merchants, for purchase.

In the illustrated embodiment, the responses of each participant are associated with the participant's profile and stored. The responses are also forwarded to a processor that reviews and analyzes the data in the responses. The processor generates an output summarizing the data from the participants in the same survey. The output may be in the form of a table, chart, report, etc, which are referred to collectively as a "report." The output can be individual participant responses and an aggregate summary of the responses of multiple participants. In the illustrated embodiment, the outputs are stored on the survey database and can be accessed by merchants via the merchant interface.

A survey report may be in any format and may include a variety of types of information. The format of a survey report may be determined, at least in part, by the research firm or a merchant who is paying for the survey. Some examples of the information that can be included in a report are:

customers' decision-making process, including:
which competitors they visited; and
why they purchased where they did;
customer satisfaction with product and service offerings;
customer satisfaction with in-store merchandising;
quality of service and in-store experience;
profiles of customers;
price and value perception;
likelihood of future purchases;
inclination of customers to recommend the retailer or service provider to others; and
free form comments and suggestions, including feedback on specific service staff.

It will be appreciated that a survey report can contain any one of or combination of these types of information along with other information not identified above.

In the illustrated embodiment, the survey report may be a dynamic status report that is continually updated upon the receipt of survey information. Survey results may be tabulated in real-time every time another participant has saved their responses on the participant interface. The real-time tabulation provides real-time, online updates to merchants and other parties.

Merchants can purchase survey results and reports by using the merchant interface. The merchant interface includes a list of surveys that are available to purchase or access. By visiting the merchant interface, the merchant can find out what survey data is available.

Once a merchant has purchased survey results, the merchant is granted access to those survey results by the research firm. Such access can be controlled by the merchant interface by requiring a password to authenticate the merchant. Access is granted to only those persons whom the merchant designates. Each merchant may have a profile on the merchant database. For example, a merchant may designate unique identification codes for several categories of personnel, such as store managers, retail managers, product managers, etc. As a result, only the appropriate personnel of a merchant can access and use the purchased survey information.

The merchant interface also enables merchants to view survey information relating to merchants other than themselves. For example, merchants can purchase survey results regarding their competitors. This information may include their competitors' customers' profiles and preferences. As a result, a market of survey data can be developed based on a geographic region, merchant category, product or service category, etc.

In the illustrated embodiment, the survey results are available via an interactive forum, such as a web site. In an alternative embodiment, the survey results can be transmitted to the particular merchant electronically, by mail, verbally, etc.

The merchant interface also enables merchants to access their accounts, which are stored on the merchant database. In the illustrated embodiment, a merchant account may include information relating to the surveys in which the merchant is in the merchant of interest, the survey results purchased by the merchant, etc.

Exemplary Embodiment

An exemplary embodiment of the present invention is described with reference to FIG. 1. Primarily, the elements of the system other than the conventional electronic transaction processing elements and steps are described. It will be appreciated that the description of this embodiment is exemplary and is not intended to be limiting.

In FIG. 1, an exemplary embodiment of an electronic transaction between a consumer and a merchant is illustrated. In the illustrated transaction, a consumer 102 indicates the desire to purchase a product or service from a merchant 110. In exchange for the article or service, the consumer 102 submits a method of payment 112 to the merchant 110. In the illustrated embodiment, the method of payment 112 is an electronic payment, such as a payment using a credit card.

The merchant 110 verifies that the consumer 102 is authorized to make this payment. The authorization process may involve the transfer of information regarding the proposed payment as represented by the dashed lines 116, 117 in FIG. 1. In some cases, an authorization inquiry 116 is sent from the merchant 110 to the acquiring bank 108 and subsequently to the transaction network 106. The transaction network 106 may be any network that offers electronic payment services, such as Visa, Mastercard, etc. Typically, the information is sent to the issuing bank 104 that issued the credit card to the consumer 102. The issuing bank 104 either authorizes or denies the transaction and sends its determination through the network 106 and bank 108 to the merchant 110. If the transaction is authorized, a settlement record 117 may be sent to the merchant 110.

The issuing bank 104 has a database that is used to collect data regarding electronic transactions. In particular, the issuing bank 104 collects and maintains data relating consumers' accounts, such as how much in payments are outstanding, what the account balance is, etc. The issuing bank 104 also collects and maintains transaction records representative of the transactions. As previously discussed, electronic transactions may include data identifying the particular parties to the transaction, the amount of the payment, the article or service purchased, and the location of the purchase. Each category of data is recorded and retained for a particular amount of time.

The research system or firm 120 coordinates with data provider 104 to forward an advertisement containing an offer to register for a survey panel to each of the customers 102. The advertisements are included with the periodic account statements that the data provider 104 sends to customers 102. In this embodiment, the data provider 104 is a credit card issuer.

Some of the customers 102 elect to participate in the survey and register via participant interface 122, such as a web site of the research film 120, as shown by arrow 128. The customers 102 that register are referred to as participants 118. Typically, the participants 118 are a subset of the customers 102. The information provided by the participants 118 during the registration process is stored in participant profiles in the offeree database 140.

Any information provided by merchants 110 or generated by the research firm as well as any information from the data provider 104 regarding merchants 110 are stored in merchant profiles in the merchant database 144. Merchants 110 can provide information about themselves via the merchant interface 126 as illustrated by arrow 134.

The research system 120 includes a monitoring interface 124 that scans and evaluates transaction records stored by the data provider 104. The transaction records may include customer information, merchant information, and transaction information as discussed above. The evaluating of the transaction records is represented by arrow 132. The data provider 104 utilizes the monitoring interface 124 to identify transactions for which a survey is desired. Monitoring includes searching transactions processed by the data provider 104 for those transactions in which the customer 102 is also a survey participant. Those transactions are evaluated to determine if it is a qualifying transaction. If the transaction meets the criteria specified by the research firm, such as criteria relating to the customer, the payment amount, and the transaction category, then the monitoring interface 124 instructs the participant interface 122 to set up a survey instrument in the survey database 142.

If the transaction is a qualifying transaction and the desired number of surveys for such a transaction has not been met, an invitation is sent to the address provided by the participant 118 during registration as shown by arrow 130. In the illustrated embodiment, the invitation may include a URL for a web page containing a survey instrument for the participant 118.

In the illustrated embodiment, the invitation to complete a survey is received by a participant 118 via Email. An invitation may include a statement such as: "Greetings, from Merchant Feedback Systems and from MBNA, as part of the survey program you previously were asked to participate in, we would like to survey you or ask you questions or hear your thoughts about your recent shopping experience at Best Buy. Please click on the following URL to complete our brief survey." The participant clicks on the URL and is transferred to the participant interface 122, which is a web site.

The survey instrument poses questions about the participant's experience purchasing the product or service, the product or service purchased, the marketing influences that caused the participant to shop at that location, and whether participant would recommend the merchant, product or service. The participant 118 responds to the questions by checking various boxes on the screen, by selecting items from menus, or by offering free-form comments. The participant 118 then submits or saves the survey. Each of these communications is represented by the arrow 130 in FIG. 1.

Once a survey is submitted, a processor adds the results of the newly completed survey to the results of all surveys about transactions in the same category. The completed surveys and survey results are stored in the survey database 142. The aggregated results can be accessed online by authorized staff of merchants via the merchant interface 126. Merchants 110 can access survey results for themselves and their competitors.

Operation of the System

Figure 2:
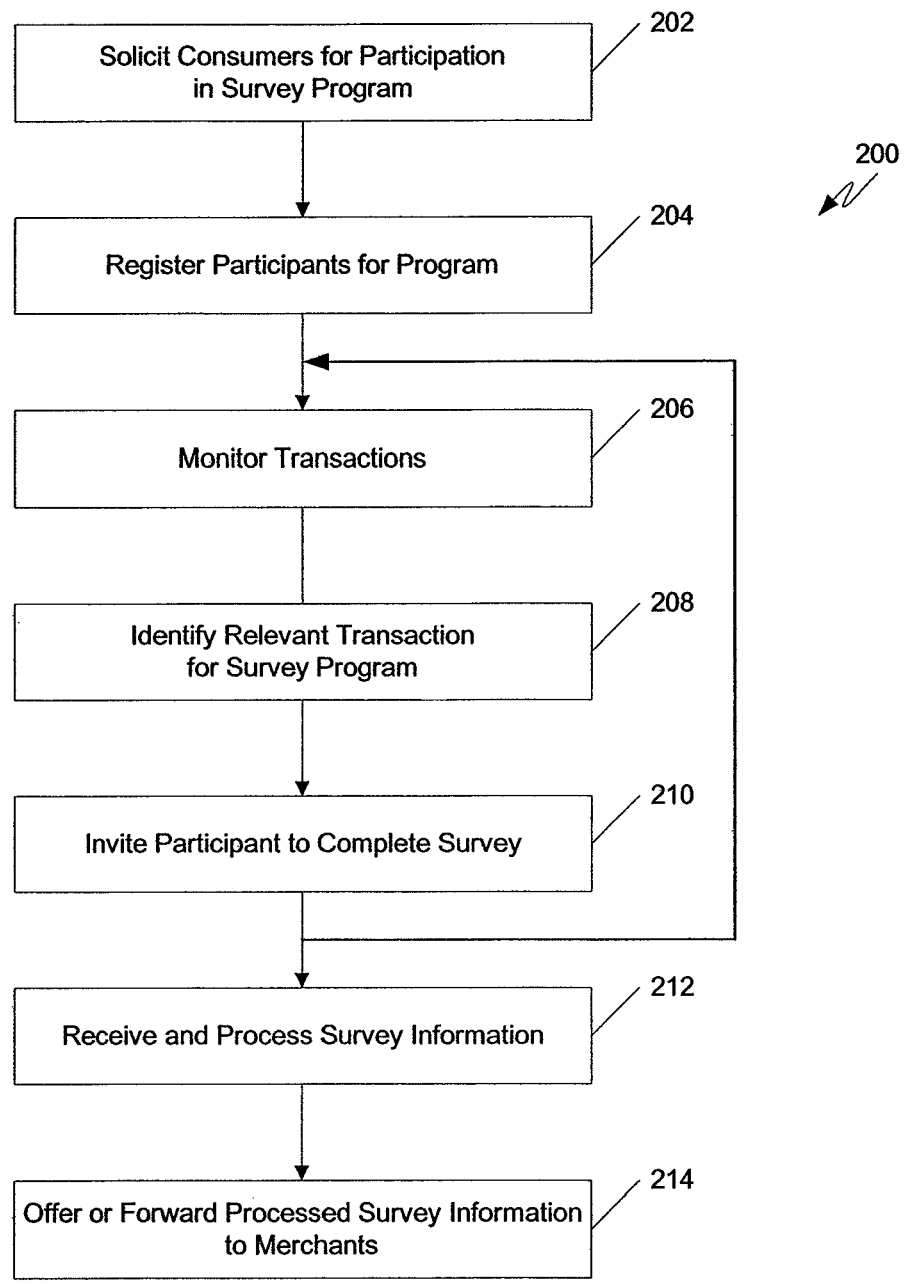
FIG. 2 illustrates a method of collecting survey information according to one embodiment of the present invention.

A process for collecting survey information embodying the principles of the invention is shown in the flow block diagram 200 depicted in FIG. 2. The flow diagram is an example of the process illustrating one process for collecting survey information. It will be appreciated that the operations of the processes embodying the principles of the invention are not limited to the exemplary operation described below with reference to FIGS. 2-3. Similarly, it is not necessary for any process to have all of the steps described below in reference to FIGS. 2-3.

Specifically, in step 202, consumers are solicited for participation in a survey program.

In the next step, step 204, the consumers who indicate an interest in participating in the survey program register. The information that the interested consumers provide is stored in an offeree database. The registered consumers are referred to as participants.

In the next step, step 206, electronic transactions involving the data provider or card issuer are monitored to identify those transactions in which a participant is involved. The transactions processed by the card issuer are searched to identify those in which the cardholder is a participant.

In the next step, step 208, transaction information relating to the particular transaction is analyzed to determine whether the transaction is proper to invoke a survey. The transaction is tested to determine whether it is a qualifying transaction and if additional survey information is needed for this category of transaction. If a survey should be sent out for the transaction, the method continues with step 210. Otherwise, the method returns to step 206 and monitors for additional transactions.

In the next step, step 210, the participant who is the cardholder in the transaction is invited to complete a survey based on the transaction. For those participants who complete the survey, the method continues to the next step. Simultaneously, the method returns to step 206 to continuously monitor and identify other relevant transactions.

In the next step, step 212, the surveys completed by the participants are received and processed. The survey information is processed and analyzed.

In the next step, step 214, the system makes the processed survey information available to the merchants. Depending on the arrangement with the particular merchants, the processed information may be posted or forwarded to the relevant merchants.

Figure 3:
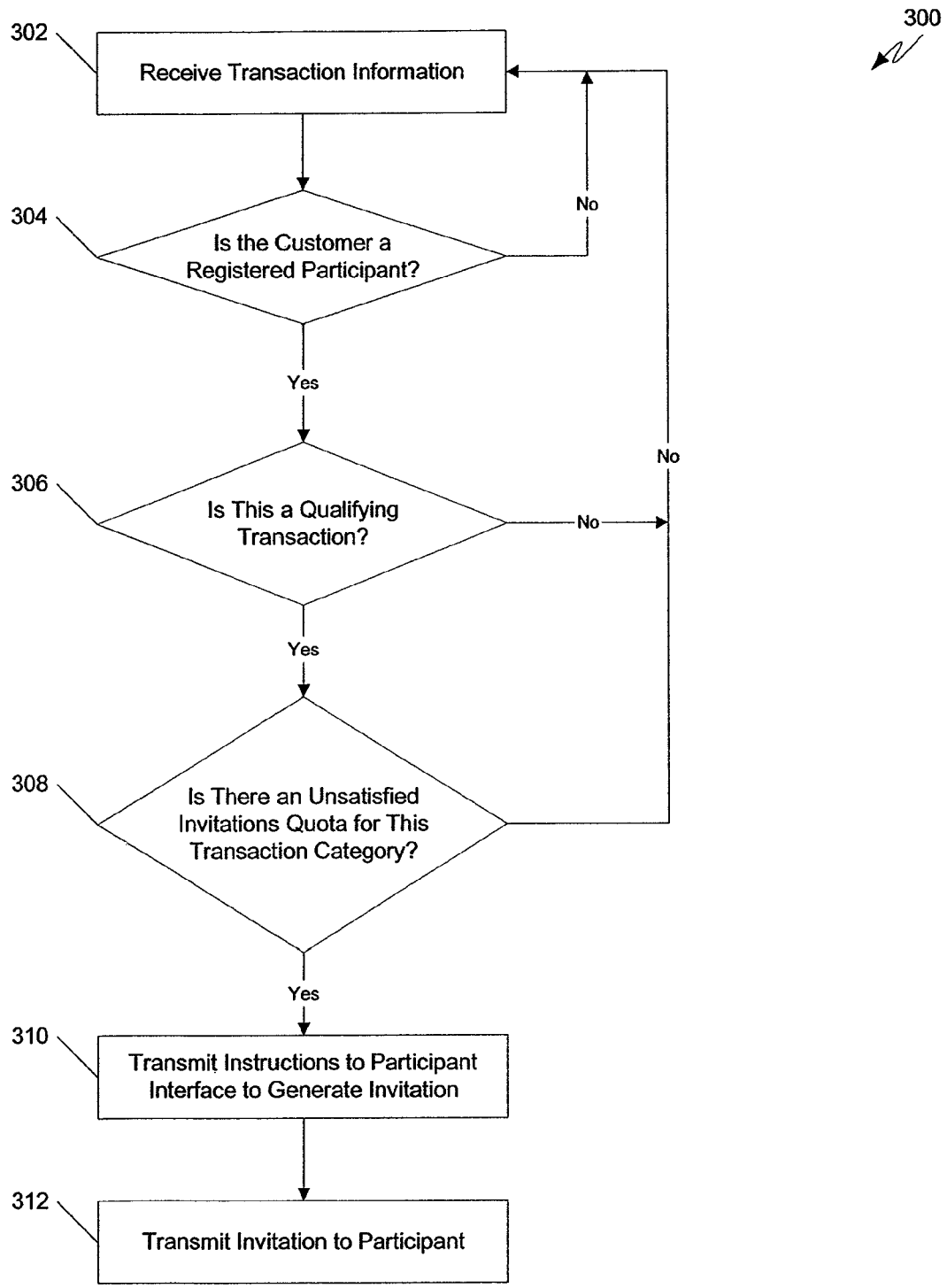
FIG. 3 illustrates a method of collecting survey information according to another embodiment of the present invention.

FIG. 3 illustrates a block diagram 300 that identifies an alternative embodiment of several steps of a method for collecting survey information.

Specifically, in step 302, transaction information relating to various transactions is received from a monitoring interface.

In the next step, step 304, the determination of whether the cardholder in the transaction is a participant in the survey program is made. If the cardholder is a participant, then the method continues with the next step. Otherwise, the method returns to step 302.

In the next step, step 306, the determination of whether the transaction is a qualifying transaction is made. This determination involves the evaluation of the transaction in terms of the payment amount and the category of the purchased product or service. If the transaction is, then the method continues with the next step. Otherwise, the method returns to step 302.

In the next step, step 308, the determination of whether there is an unsatisfied quota of invitations to participate in a survey for this transaction category is made. If the quota has not been met yet, then the method continues with the next step. Otherwise, the method returns to step 302.

In the next step, step 310, the monitoring interface transmits instructions to the participant interface to generate an invitation to send to a participant. The method continues with step 312.

In the next step, step 312, the participant interface transmits an invitation to the participant. The process includes additional steps regarding the handling of survey information which are not illustrated in FIG. 3.

In the present invention, a system and method are provided by which customer survey information may be easily and efficiently collected and processed. Customers are targeted based on information collected by data providers, such as a credit card issuing bank. Transaction records for transactions involving participating customers are identified by the system using customer identification codes. The transaction records are evaluated to determine whether the transaction meets predetermined criteria for a transaction that the research firm is interested in collecting customer information. If the customer criteria and transaction criteria are met, then a survey invitation is transmitted to the customer. Completed surveys are collected and processed. The survey results are sold or distributed to merchants and other interested parties.

It is to be appreciated that the description above is not limited to the particular processes specifically described, but is applicable to many variations on the process including targeting customers based on transactions other than electronic transactions.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A non-transitory processor-readable medium storing code representing instructions to be executed by a processor, the code comprising code to cause the processor to:
   receive transaction information related to a transaction from a financial institution involved in the transaction and associated with the consumer in the transaction, the transaction information including consumer information and merchant information;
   compare the consumer information with predetermined consumer information associated with a plurality of registered consumers;
   compare the merchant information with predetermined merchant information; and
   determine whether to invite a consumer from the plurality of registered consumers to complete a survey related to the transaction based at least partially on a projected invitation quantity, the comparison of the consumer information and the comparison of the merchant information.

2. The non-transitory processor-readable medium of claim 1, wherein the consumer information includes a consumer identification code, and the predetermined consumer information includes information relating to consumers defined as prospective offerees.

3. The non-transitory processor-readable medium of claim 1, wherein the predetermined merchant information includes information relating to categories of purchases, and wherein the code to determine whether to invite the consumer to complete a survey includes code to determine whether the transaction corresponds to one of said categories of purchases.

4. The non-transitory processor-readable medium of claim 3, wherein the code to determine whether the transaction corresponds to one of said categories of purchases includes code to determine whether there is an unsatisfied quota of survey invitations for the particular type of transaction.

5. The non-transitory processor-readable medium of claim 1, wherein the code to determine whether to invite the consumer to complete a survey includes code to determine whether the transaction meets predetermined criteria and is a qualifying transaction.

6. The non-transitory processor-readable medium of claim 5, further comprising code to:
transmit to the consumer an invitation to complete a survey relating to the qualifying transaction;
receive survey information from the consumer relating to the qualifying transaction; and
process the received survey information.

7. The non-transitory processor-readable medium of claim 6, wherein the predetermined consumer information is provided by a party to the transaction other than a merchant.

8. The non-transitory processor-readable medium of claim 7, further comprising code to:
offer processed survey information to the merchant; and
grant access to the processed survey information to the merchant.

9. The non-transitory processor-readable medium of claim 1, wherein the transaction information includes a transaction record, the transaction record being in at least one of an electronic form and a digital form, the code to receive transaction information includes code to receive a set of transaction information regarding several transactions.

10. The non-transitory processor-readable medium of claim 1, wherein each consumer from the plurality of registered consumers has an account with the financial institution.

11. A non-transitory processor-readable medium storing code representing instructions to be executed by a processor, the code comprising code to cause the processor to:
invite consumers to participate in a survey program;
receive consumer information from participating consumers;
develop historical consumer information for each of the participating consumers;
receive transaction information relating to a transaction from a financial institution associated with a consumer in the transaction, the financial institution being other than a merchant in the transaction, the transaction information including information relating to the consumer in the transaction and merchant information relating to the merchant in the transaction;
determine, using the information relating to the consumer in the transaction, that the consumer in the transaction is a participating consumer registered in the survey program; and
determine, based on the historical consumer information, the merchant information, and a projected invitation quantity, whether to collect survey information from the consumer in the transaction.

12. The non-transitory processor-readable medium of claim 11, wherein the information relating to the consumer in the transaction includes a consumer identification code, and the historical consumer information includes at least one of the number of invitations sent to the consumer and the number of surveys completed by the consumer.

13. The non-transitory processor-readable medium of claim 11, wherein the transaction information includes at least one of a category of the transaction and the payment amount of the transaction, and the code to determine whether to collect survey information from the consumer in the transaction uses at least one of the category of the transaction and the payment amount of the transaction.

14. The non-transitory processor-readable medium of claim 11, further comprising code to:
collect survey information via a survey invitation to the consumer to the transaction, and the survey invitation includes instructions regarding the survey.

15. The non-transitory processor-readable medium of claim 14, wherein the survey invitation includes a survey instrument.

16. The non-transitory processor-readable medium of claim 14, wherein the transaction information includes a transaction record, the transaction record being in at least one of an electronic form and a digital form, and the code representing instructions to cause a processor to receive transaction information is configured to cause a processor to receive a set of transaction information regarding several transactions.

17. A system for collecting survey information relative to a transaction between a consumer and a merchant, comprising:
a monitoring interface configured to process transaction information from a transaction, the transaction information received from a financial institution associated with a consumer in the transaction, the transaction information including a transaction record with information relating to the consumer to the transaction and merchant information relating to a merchant in the transaction, the transaction record being in at least one of an electronic form and a digital form, the consumer being registered in a survey program;
a processor configured to analyze said transaction record relative to stored consumer information, the processor further configured to determine whether to solicit survey information from the consumer to the transaction based at least partially on a projected invitation quantity, the information relating to the consumer to the transaction, the merchant information, and the stored consumer information; and
a participant interface configured to enable the consumer to the transaction to provide survey information.

18. The system of claim 17, wherein the transaction record includes information relating to at least one of a category of the transaction and a payment amount of the transaction, and said processor determines whether to solicit survey information based on at least one of a category of the transaction and a payment amount of the transaction.

19. The system of claim 17, wherein the information relating to the consumer to the transaction includes an identification code for the consumer to the transaction, and the processor compares identification codes of consumers to transactions with predetermined identification codes of participants in the survey.

20. The system of claim 17, further comprising:
a merchant interface configured to enable the merchant to access analyzed survey information.

21. The system of claim 17, wherein the stored consumer information is provided by a party to a transaction other than the merchant.

* * * * *